United States Patent [19]

Fujisaki

[11] Patent Number: 4,716,584
[45] Date of Patent: Dec. 29, 1987

[54] NOISE-FREE TERMINAL STATION COMPATIBLE WITH EXISTING MASTER STATIONS

[75] Inventor: Hisashi Fujisaki, Tokyo, Japan

[73] Assignee: NEC Corporation, Tokyo, Japan

[21] Appl. No.: 866,519

[22] Filed: May 23, 1986

[30] Foreign Application Priority Data

May 24, 1985 [JP] Japan .................................. 60-111915

[51] Int. Cl.[4] .............................................. H04M 1/74
[52] U.S. Cl. .................................... 379/176; 379/167; 379/416
[58] Field of Search ................ 379/167, 169, 171, 172, 379/176, 165, 156, 387, 397, 413, 324, 338, 416; 455/3, 5

[56] References Cited

FOREIGN PATENT DOCUMENTS 1437032  5/1976  United Kingdom ................ 379/176

*Primary Examiner*—James L. Dwyer
*Attorney, Agent, or Firm*—Sughrue, Mion, Zinn, Macpeak & Seas

[57] ABSTRACT

A terminal station operating with a current supplied from a master station exchanges signals with it through cable conductors, one of the cable conductors being grounded at the master station to allow the current to return from the terminal station. A receive circuit is formed by a first differential amplifier and a first resistor network connected in a balanced relationship to input terminals of the first differential amplifier for receiving a signal from the master station in a noise-cancelling relationship with respect to the ground potential to eliminate the effect of noise generated by the passage of the current through the ground conductor. A transmit circuit includes a second differential amplifier and a second resistor network connected in a balanced relationship to input terminals of the second differential amplifier for transmitting a signal to the master station in a noise-cancelling relationship with respect to the ground potential to eliminate the effect of the noise at the output of the second differential amplifier.

3 Claims, 4 Drawing Figures

MASTER STATION    TERMINAL STATION

NOISE-FREE TERMINAL STATION COMPATIBLE WITH EXISTING MASTER STATIONS

BACKGROUND OF THE INVENTION

The present invention relates to a vehicle-mounted telecommunication system in which master and terminal stations are coupled by cable conductors. In one application, the master station is a radio tranceiver located in a trunk room of the vehicle and the terminal station is a telephone handset located in the passenger compartment.

In a prior art vehicle-mounted system, the terminal station comprises a first differential amplifier circuit that receives signals from the master station over a pair of cable conductors, one of which is grounded at the master station to allow passage of load current from the terminal station. A second differential amplifier circuit is provided having a first input terminal connected to the ground conductor and a second input terminal connected to one terminal of a signal source the other terminal of which is connected to the ground conductor. This type of prior art system simplifies the interface of the master station, but suffers from noise generated by a large amount of load current passing through the ground conductor when the terminal station drives a heavy load such as loudspeaker.

The noise problem has been solved by a prior art system which employs a first pair of differential amplifiers on a transmission circuit from master station to terminal station and a second part of differential amplifiers on a transmission circuit from terminal station to master station. The receiving end of each transmission circuit is formed by a differential amplifier having a balancing resistor network to minimize the effect of noise generated in a ground conductor on the transmission circuits.

However, the noise-free terminal station is designed exclusively for use with master stations with the noise-free configuration. Difficulty thus arises when it is desired to connect a noise-free terminal station to an existing master station having no noise-free arrangement.

SUMMARY OF THE INVENTION

It is therefore an object of the present invention to provide a terminal station which satisfies the noise-free and compatibility requirements.

Specifically, a terminal-station apparatus according to the present invention is adapted to operate with a current supplied from a master-station apparatus for receiving a first signal from and transmitting a second signal to the master-station apparatus through cable conductors, one of the cable conductors being a ground conductor through which the current returns from the terminal-station apparatus to ground at the master-station apparatus, producing a reference potential at the ground and a noise-generating potential at the terminal-station end of the ground conductor. The terminal-station apparatus comprises a receive circuit including a first differential amplifier and a first resistor network connected in a balanced relationship to input terminals of the first differential amplifier for receiving the first signal in a noise-cancelling relationship with respect to the reference potential to eliminate the effect of the noise-generating potential at the output of the first differential amplifier. A transmit circuit includes a second differential amplifier and a second resistor network connected in a balanced relationship to input terminals of the second differential amplifier for transmitting the second signal therefrom in a noise-cancelling relationship with respect to the reference potential to eliminate the effect of the noise-generating potential at the output of the second differential amplifier.

Preferably, the first resistor network comprises first and second pairs of resistors of equal values, the resistors of the first pair being series-connected between the ground conductor and a first, common cable conductor and the resistors of the second pair being series-connected between the output of the first operational amplifier and a second cable conductor. A junction between the first pair of resistors is connected to a first input of the first operational amplifier, the junction between the second pair of resistors being connected to a second input of the first operational amplifier. The second resistor network comprises third and fourth pairs of resistors of equal values, the resistors of the third pair being series-connected between the ground conductor and the common cable conductor and the resistors of the fourth pair being series-connected between the output of the second operational amplifier and a signal source. A junction between the third pair of resistors is connected to a first input of the second operational amplifier and a junction between the fourth pair of resistors is connected to a second input of the second operational amplifier.

BRIEF DESCRIPTION OF THE DRAWINGS

The present invention will be described in further detail with reference to the accompanying drawings, in which.

DETAILED DESCRIPTION

Figure 1:
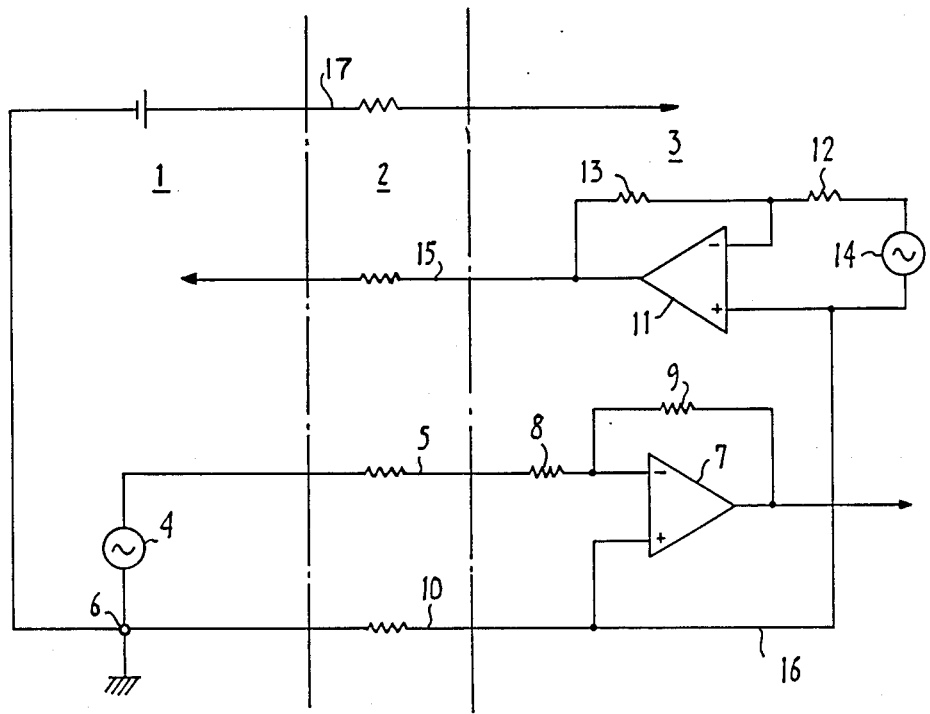
FIG. 1 is an illustration of a prior art embodiment of interface circuits between master and terminal stations.
Figure 2:
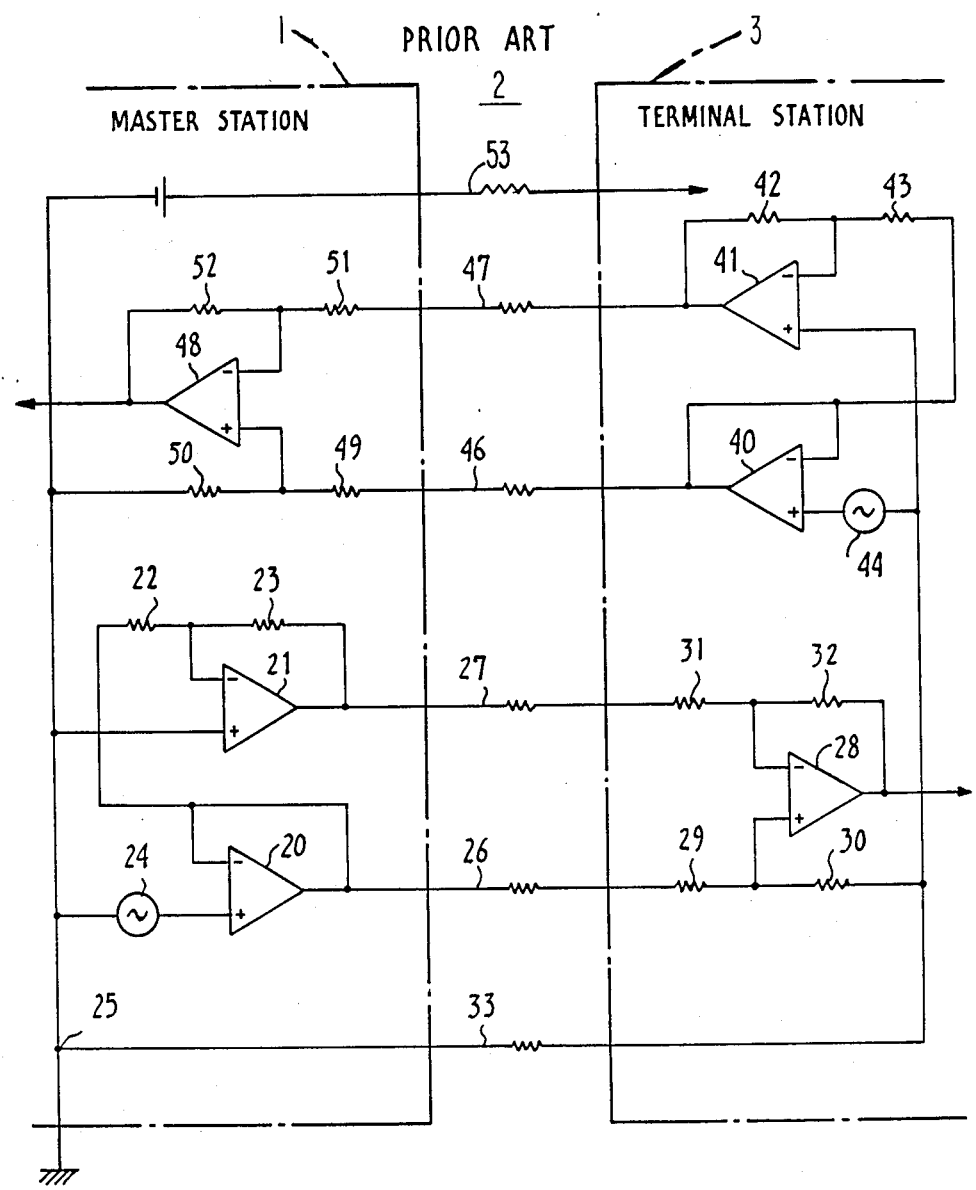
FIG. 2 is an illustration of another prior art embodiment.

Before going into the detail of the present invention, it is appropriate to describe prior art interface circuits shown in FIGS. 1 and 2.

In FIG. 1, a master-station apparatus 1 transmits signals over a cable 2 to a terminal-station apparatus 3. Master-station apparatus 1 includes a signal source 4 having a first terminal coupled to one end of a conductor 5 and a second terminal coupled to ground terminal 6. Terminal-station apparatus 3 includes an operational amplifier 7 and resistors 8, 9. The inverting input of operational amplifier 6 is connected through resistor 8 to the other end of conductor 5 and further connected through resistor 9 to the output of operational amplifier 7. The noninverting input of operational amplifier 7 is connected through a conductor 10 to the ground terminal 6 of the master station. For transmission, terminal-station apparatus 3 includes an operational amplifier 11, resistors 12, 13 and a signal source 14. The inverting input of operational amplifier 11 is connected through resistor 12 to one terminal of the signal source 14 and further connected through resistor 13 to the output of operational amplifier 11 which is coupled by a conductor 15 to the master-station apparatus 1. The noninverting input of operational amplifier 11 and the second terminal of source 14 are connected together by line 16 to the ground conductor 10. The terminal station 3 receives power from a battery at master station 1 through conductor 17. One problem associated with this prior art embodiment is that when the amount of current passing through the ground conductor 10 has increased significantly due to increase in load, a voltage drop occurs across the opposite ends of conductor 10 and such a voltage drop varies with load variation, producing noise in the information signals.

To overcome the noise problem, a prior art embodiment shown in FIG. 2 has been developed. In this embodiment, the master-station apparatus 1 comprises a pair of operational amplifiers 20 and 21. The inverting input of operational amplifier 20 is connected to its output terminal and further connected to one end of a series circuit of resistors 22 and 23, the other end of which is connected to the output of operational amplifier 21 and the junction of which is connected to the inverting input of amplifier 21. A signal source 24 is connected between the noninverting input of operational amplifier 20 and ground terminal 25 to which the noninverting input of operational amplifier 21 is also connected. The output terminals of amplifiers 20 and 21 are respectively connected through conductors 26 and 27 to terminal-station apparatus 3.

The terminal-station apparatus 3 comprises an operational amplifier 28, a first series circuit of resistors 29 and 30, and a second series circuit of resistors 31 and 32. Resistors 29 and 30 are connected in series between conductor 26 and a ground conductor 33 and the noninverting input of amplifier 28 is connected to a junction between resistors 29 and 30. Resistors 31 and 32 are connected in series between conductor 27 and the output of amplifier 28 and the inverting input of amplifier 28 is connected to a junction between resistors 31 and 32. Thus, each of the operational amplifiers 20 and 21 constitutes a differential amplifier for the associated cable conductor to cancel noise which is generated by a current passing through ground conductor 33. The transmission circuit from terminal station to master station has a similar configuration to the transmission circuit from master station to terminal station. At terminal station 3, operational amplifiers 40, 41 and resistors 42, 43 constitute differential amplifiers for transmission of a signal from signal source 44 through conductors 46 and 47. The noninverting input of amplifier 40 is connected to one terminal of signal source 44 the other terminal of which is connected together with the noninverting input of amplifier 41 to ground conductor 33. At master station 1, an operational amplifier 48 and resistors 49 through 52 provides a differential circuit for signals transmitted over conductors 46 and 47. Current through conductor 46 is passed through resistors 49 and 50 to ground terminal 25. The conductors of each circuit are thus balanced with each other with respect to ground conductor 33 to minimize the effect of noise generated by current passing through conductor 33. The terminal station 3 receives power from a battery at master station 1 through a conductor 53.

However, difficulty exists when connecting the terminal station of FIG. 2 to an existing master station having the configuration of FIG. 1 due to the lack of compatibility between them.

Figure 3:
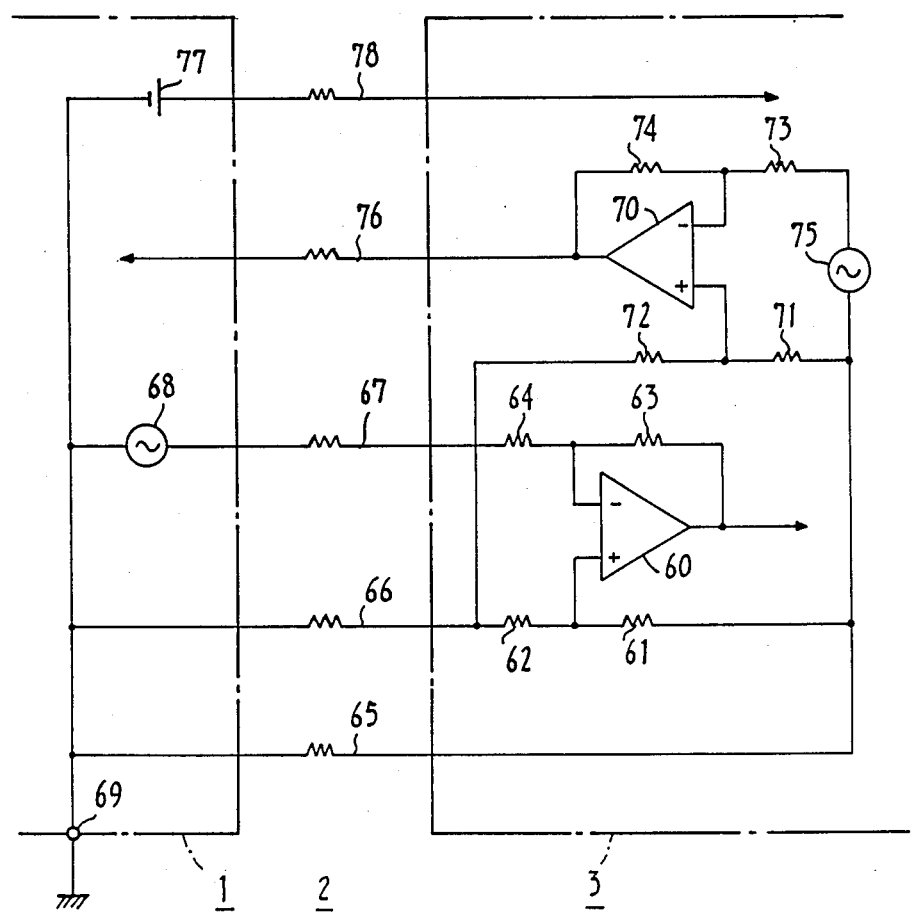
FIG. 3 is a circuit diagram according to a first embodiment of the present invention.

An interface circuit shown in FIG. 3 is constructed according to an embodiment of the present invention which allows a noise-free terminal-station apparatus to be connected to an existing master-station apparatus of the type of FIG. 1. The reception circuit of this interface comprises an operational amplifier 60 having its noninverting input connected to a junction between resistors 61 and 62 which are series-connected between the receive ends of conductors 65 and 66. The inverting input of operational amplifier 60 is connected to a junction between resistors 63 and 64 which are connected between the output of operational amplifier 60 and the receive end of a conductor 67, the transmit end of which is coupled to a terminal of a signal source 68 at master-station apparatus 1. The terminal of signal source 68 and the transmit ends of conductors 65 and 66 are connected to a ground terminal 69.

The transmission circuit of the interface comprises an operational amplifier 70 having its noninverting input coupled to a junction between resistors 71 and 72 which are series-connected between the receive ends of conductors 65 and 66 in parallel with resistors 61 and 62. The inverting input of operational amplifier 70 is connected to a junction between resistors 73 and 74 which are series-connected between one terminal of a signal source 75 and the output of operational amplifier 70 which is in turn connected by a conductor 76 to the master station. The other terminal of signal source 75 is connected to the receive end of ground conductor 65. All the circuit components of terminal-station apparatus 3 receive power from a battery 77 at master station through a conductor 78.

The operation of the circuit of FIG. 3 will be understood by the following quantitative analysis.

If the load of the terminal station increases, there is an increase in current passing through ground conductor 65, causing a corresponding potential difference $V_{65}$ to develop across the transmit and receive ends of ground conductor 65 as follows:

$$V_{65} = i_{65} \times r_{65} \qquad (1)$$

where $i_{65}$ is the current passing through conductor 65 and $r_{65}$ is the impedance of conductor 65.

If resistors 71–74 are of equal resistance values, typically 100 kiloohms, and conductor 66 has an impedance much smaller than the individual values of resistors 71–74, typically at 4 ohms, then the output voltage $e_{70}$ of operational amplifier 70 with respect to the ground potential of the terminal station is given by:

$$e_{70} = -v_{65} \times \frac{r_{71}}{r_{66} + r_{72} + r_{71}} \times \left(1 + \frac{r_{74}}{r_{73}}\right) \qquad (2)$$

$$-e_{75} \times \frac{r_{74}}{r_{73}} = -v_{65} - e_{75}$$

where $r_{66}$, $r_{71}$ through $r_{74}$ represent the values of resistors 66, 71 through 74, respectively, and $e_{75}$ is the voltage of signal source 75 with respect to the ground potential of the terminal station 3.

If the output voltage of operation amplifier 70 is measured with respect to the ground potential of the master station 1, voltage $e_{70}$ is given by $-e_{75}$. Therefore, the effect of noise voltage $e_{65}$ is eliminated.

Likewise, if resistors 61–64 are of equal resistance values, typically 100 kiloohms, the output voltage $v_{60}$ of operational amplifier 60 is given by:

$$e_{60} = -(e_{68} - v_{65}) \times \frac{r_{63}}{r_{64}} + (-v_{65}) \times \frac{r_{61}}{r_{66} + r_{62} + r_{61}} \times \qquad (3)$$

$$\left(1 + \frac{r_{63}}{r_{64}}\right) = -e_{68}$$

where $e_{68}$ is the voltage of signal source 68 measured with respect to the ground potential of the master station, and $r_{61}$ through $r_{64}$ are the values of resistors 61 through 64, respectively. Therefore, the effect of the noise component $v_{65}$ is eliminated. It is seen therefore that the terminal station of FIG. 3 can be connected to an existing master station of FIG. 1 configuration without altering the master station, while retaining the noise-free feature of the prior art of FIG. 2.

It is seen that by comparison with FIG. 2, the number of cable conductors required by the present invention for transmission of signals is smaller than that required by the FIG. 2 prior art.

Figure 4:
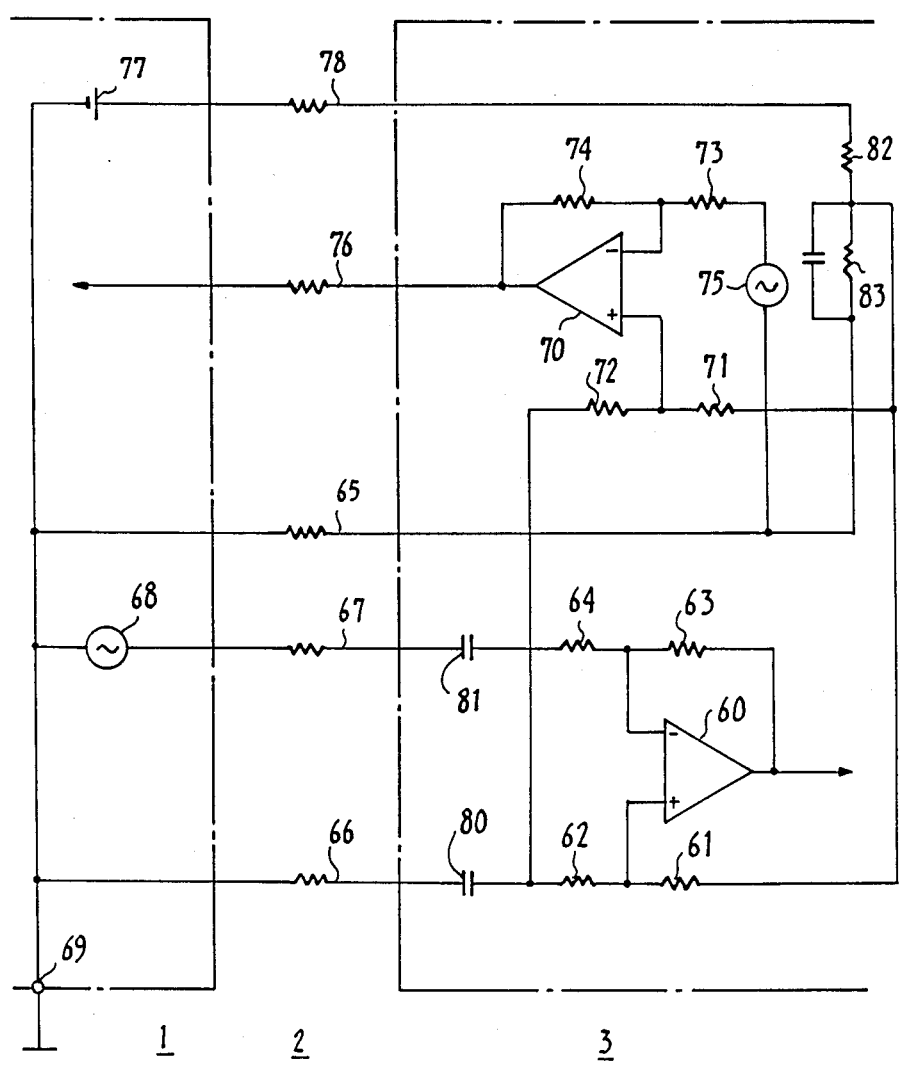
FIG. 4 is a circuit diagram according to a second embodiment of the present invention.

FIG. 4 is an illustration of a modified embodiment of the invention which is suitable for transmitting signals containing no DC components. DC decoupling capacitors 80 and 81 are connected in the cable conductors 66 and 67, respectively, to cut off DC voltages. Resistors 82 and 83 are series-connected from conductor 78 to ground conductor 65 with a junction therebetween connected to resistors 61 and 71, so that the ground potential (reference potential) is maintained at one-half of the DC voltage of battery 77 with respect to that junction.

What is claimed is:

1. A terminal-station apparatus adapted to operate with a current supplied from a master-station apparatus for receiving a first signal from and transmitting a second signal to the master-station apparatus through cable conductors, one of said cable conductors being a ground conductor through which the current returns from said terminal-station apparatus to ground at said master-station apparatus, producing a reference potential at said ground and a noise-generating potential at the terminal-station end of said ground conductor, comprising:

receive means having a first differential amplifier and a first resistor network connected in a balanced relationship to input terminals of said first differential amplifier for receiving said first signal in a noise-cancelling relationship with respect to said reference potential to eliminate the effect of said noise-generating potential at the output of said first differential amplifier, said input terminals of said first differential amplifier being coupled through said first resistor network over first and second conductors to said master-station apparatus; and transmit means having a second differential amplifier and a second resistor network connected in a balanced relationship to input terminals of said second differential amplifier for transmitting said second signal therefrom in a noise-cancelling relationship with respect to said reference potential to eliminate the effect of said noise-generating potential at the output of said second differential amplifier, an output terminal of said second differential amplifier being connected over a third conductor to said master-station apparatus and one of said input terminals of said second differential amplifier being coupled through said second resistor network to said first conductor.

2. A terminal-station apparatus as claimed in claim 1, wherein said first resistor network comprises first and second pairs of resistors of equal values, the resistors of the first pair being series-connected between said ground conductor and a first, common cable conductor and the resistors of the second pair being series-connected between the output of said first operational amplifier and a second cable conductor, a junction between the first pair of resistors being connected to a first input of said first operational amplifier and a junction between the second pair of resistors being connected to a second input of the first operational amplifier, and wherein said second resistor network comprises third and fourth pairs of resistors of equal values, the resistors of the third pair being series-connected between said ground conductor and said common cable conductor and the resistors of the fourth pair being series-connected between the output of said second operational amplifier and a signal source, a junction between the third pair of resistors being connected to a first input of said second operational amplifier and a junction between the fourth pair of resistors being connected to a second input of the second operational amplifier.

3. A terminal-station apparatus as claimed in claim 2, further comprising first and second DC decoupling capacitors connected respectively in said first and second conductors and means for biasing said ground conductor at a DC potential with respect to a junction between said first and third resistors.

* * * * *